United States Patent [19]

Tachihara et al.

[11] 4,059,916
[45] Nov. 29, 1977

[54] LIGHT DIFFUSING DEVICE

[75] Inventors: Noribumi Tachihara, Tokyo; Yukio Mizohata, Kawagoe; Jun-ichi Makita, Tokorozawa, all of Japan

[73] Assignee: Copal Company Limited, Tokyo, Japan

[21] Appl. No.: 652,574

[22] Filed: Jan. 26, 1976

[30] Foreign Application Priority Data

| Jan. 30, 1975 | Japan | 50-12799 |
|---|---|---|
| Apr. 17, 1975 | Japan | 50-52177[U] |
| May 8, 1975 | Japan | 50-62501[U] |
| May 22, 1975 | Japan | 50-69013[U] |
| Sept. 9, 1975 | Japan | 50-123458[U] |
| Sept. 11, 1975 | Japan | 50-125560[U] |

[51] Int. Cl.² ............................. G09F 13/18
[52] U.S. Cl. ............................. 40/130 K; 40/152.2; 362/31
[58] Field of Search ............... 40/130 K, 152.2; 240/1 EL; 350/96 R

[56] References Cited

U.S. PATENT DOCUMENTS

| 2,523,290 | 9/1950 | Gardner | 40/130 K X |
|---|---|---|---|
| 2,831,453 | 4/1958 | Hardesty | 40/130 K X |
| 3,152,810 | 5/1964 | Ostensen | 240/1 EL |
| 3,242,328 | 3/1966 | Kapany et al. | 240/1 EL |
| 3,328,570 | 6/1967 | Baichunas | 240/1 EL |
| 3,464,133 | 9/1969 | DeDoray | 40/130 K |

FOREIGN PATENT DOCUMENTS

| 167,111 | 3/1954 | Australia | 40/130 X |
|---|---|---|---|

*Primary Examiner* — John F. Pitrelli
*Attorney, Agent, or Firm* — Haseltine, Lake & Waters

[57] ABSTRACT

The light diffusing device for illumination purpose includes a light source, a thin transparent base plate having a front illuminating surface and a rear surface and arranged with its side edge adjacent to the light source so as to receive light therefrom and a light reflecting plate located adjacent to or in contact with the rear surface of the base plate. The rear surface is treated so as to have a directional light reflecting property as well as a light transmitting property so that a portion of the light received from the light source is directly emanated from the front surface of the base plate while a portion of the remainder of the light is repeatedly reflected by the rear surface and the front surface predominantly toward the opposite side edge of the base plate so as to be emanated from the front surface, the remainder of the light being reflected by the reflecting plate after passing through the rear surface, thereby permitting the light to be emanated from the front surface uniformly over the entire area thereof. The light diffusion device provides a surface illuminating device for various appliances.

20 Claims, 38 Drawing Figures

Fig. 3
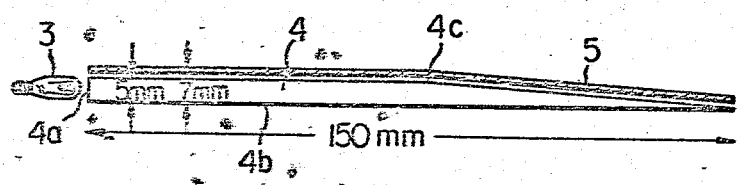
Fig. 4
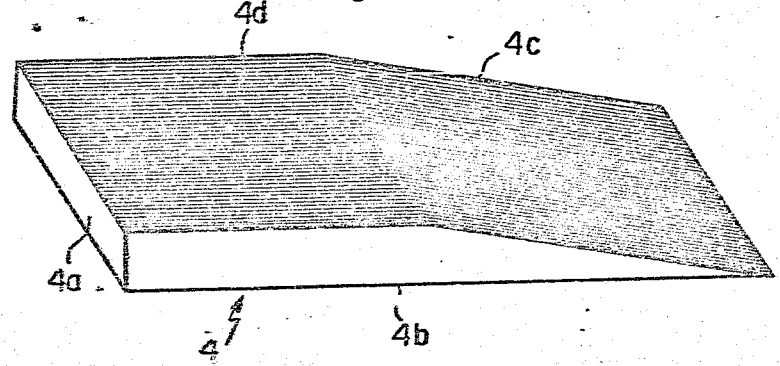
Fig. 5
TRANSPARENT BASE PLATE SURFACE OF DISTRIBUTION OF BRIGHTNESS IN ILLUMINATION
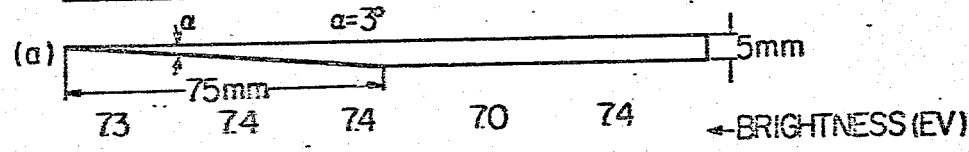
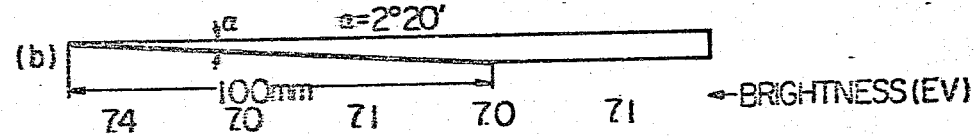
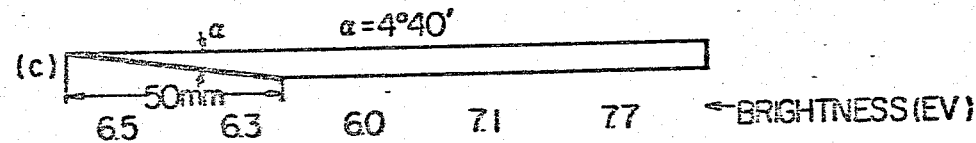

DISTRIBUTION OF BRIGHTNESS OF VARIOUS TYPES OF REFLECTING PLATE

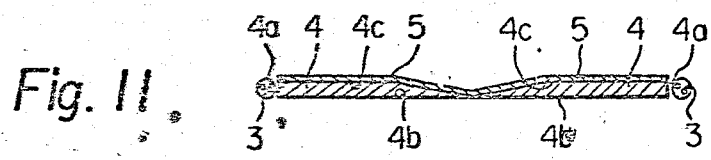
Fig. 11.
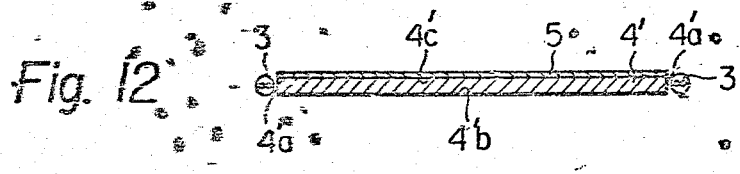
Fig. 12.
Fig. 13
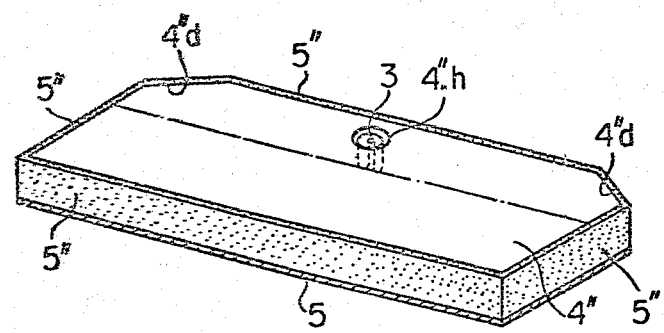
Fig. 14
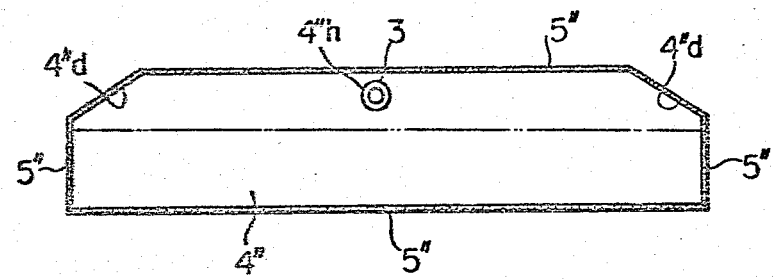

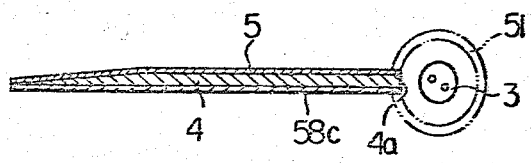
Fig. 32
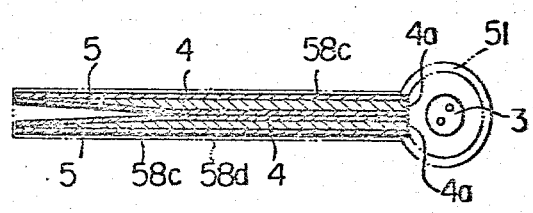
Fig. 33
Fig. 34
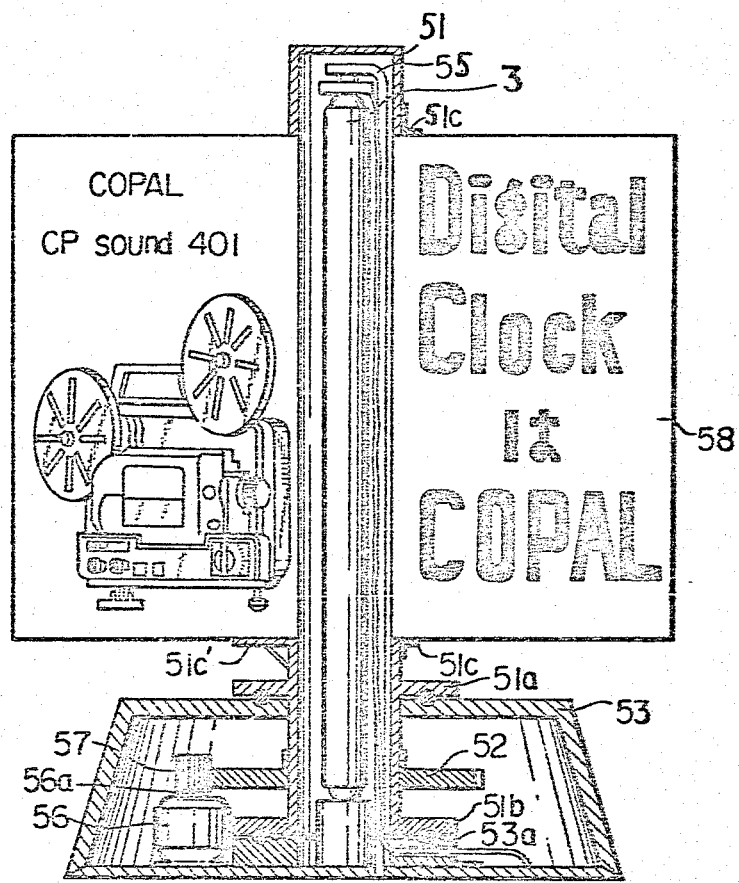

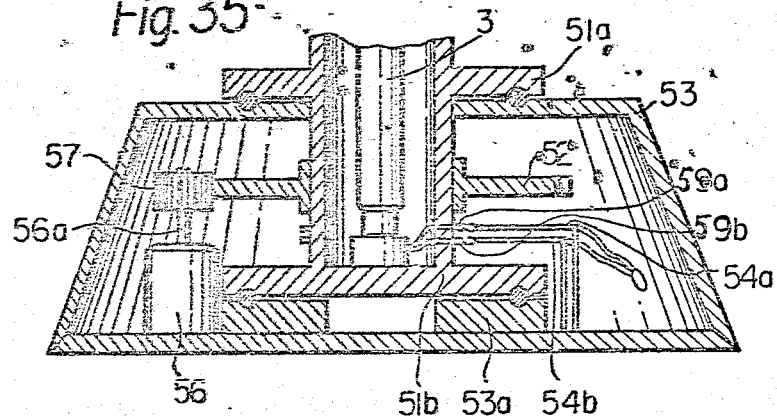
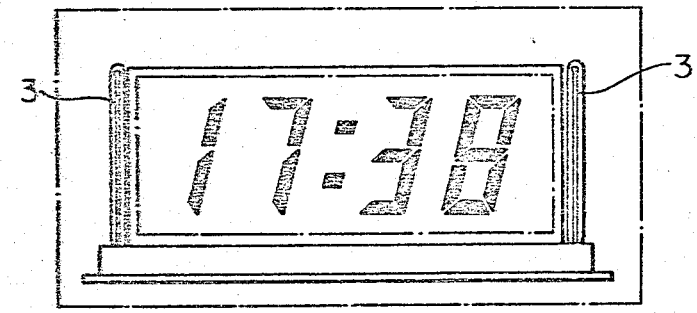
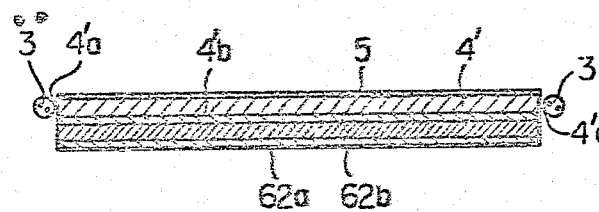
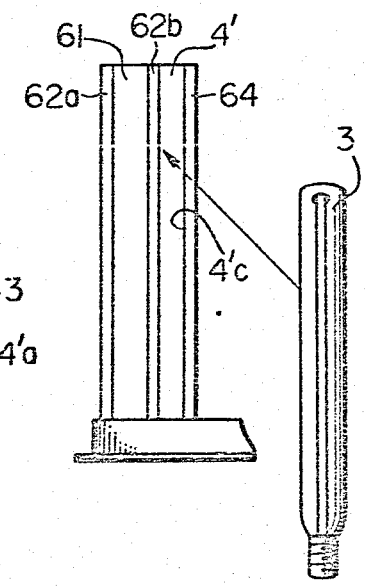

LIGHT DIFFUSING DEVICE

BACKGROUND OF THE INVENTION

The present invention relates to a light diffusing device for illuminating purpose to provide a surface illuminating device.

Heretofore, a light diffusing plate such as a milk glass plate or frosted glass plate been used together with a light source located behind the glass plate spaced a distance therefrom perpendicular to the illuminating surface of the glass plate in order to obtain a surface illuminating device or a two-dimensional light source.

In diffusing the light in the above described manner, however, there exists two mutually contradictory relationships between the intensity of the brightness obtained by the light diffusing glass plate and the uniformity in the distribution of the intensity of light emanated from the glass plate. The first is that the area of the light diffusing glass plate in which the brightness is held uniform becomes larger as the distance between the light source and the glass plate is made greater, whereas the intensity of the brightness is lowered. To the contrary, when the distance between the light source and the glass plate is made smaller, the area in which the intensity of the brightness is held uniform becomes smaller but the intensity of the brightness is made greater. The second is that the transmittivity of light is in general reduced to lower the brightness obtained by the diffusing glass plate when the diffusibility of the diffusing glass plate is increased, whereas the area in which the uniformity of the intensity of the brightness is maintained is made small when the transmittivity is increased.

Therefore, in order to obtain a wide area plane light source having a uniform brightness over the entire area thereof in the above described manner, it has been necessary either to provide a light source having a large power which is located at a sufficient distance from the light diffusing plate or to provide a plurality of light sources arranged in the distributed locations with respect to the diffusing plate. In either of the above described methods, however, the consumption of large electric power is required and the diffusing device is rendered to be a large size. In the former method, a severe restriction is given in the arrangement and the provision of the device, because sufficient distance must be provided between the light source and the diffusing plate, while such a device is inappropriate for use with an appliance having a thin thickness such as an illumination table, a wall hanged decoration, and an embedded advertizing device. Further, a cooling device must be provided in the device of the prior art described above.

SUMMARY OF THE INVENTION

An object of the present invention is to provide a novel and useful light diffusing device for illumination purpose which avoids the above described disadvantages of the prior art device.

Another object is to provide a light diffusing device of the type described above which not only provides a very efficient light diffusing device having a wide bright uniform diffusing surface by using only a very few number of light sources, but also has a very thin thickness.

A further object is to provide a light diffusing device of the type described above which is combined with an image bearing member or an indicating member so as to constitute a decoration or an indication appliance.

The above objects are achieved in accordance with the present invention by the provision of a light diffusing device for illumination purpose including a light source, a thin transparent base plate having a front illuminating surface and a rear surface and arranged with its side edge adjacent to the light source so as to receive light therefrom thereby permitting the light thus received in the base plate to be emanated from the front illuminating surface over the entire area thereof with a portion of the light directly emanated from the front surface while the remainder of the light is reflected by the rear surface and emanated from the front surface or repeatedly reflected by the front and the rear surface so as to be finally emanated from the front surface, the diffusing device being characterized in that the rear surface is treated so as to have a superior directional light reflecting and light transmitting property to render the reflected light to be predominantly directed toward the side edge of the base plate opposite to that at which the light is received from the light source, and a light reflecting plate is arranged adjacent to the rear surface thereby permitting the light to be emanated from the front surface with a uniform intensity of illumination over the entire area thereof.

A portion of the rear surface of the base plate at the side edge opposite to that at which the light is received from the light source may be bevelled so as to reduce the thickness at that side edge to zero thereby permitting the reflected light to be more efficiently emanated from the front surface with a uniform distribution of light being maintained over the entire area thereof.

Various effective display and indicating devices may be obtained with the light diffusing device of the present invention.

BRIEF DESCRIPTION OF THE DRAWINGS

FIG. 3 is a side view of FIG. 2;

FIG. 4 is a perspective view showing an example of the rear surface of the transparent base plate provided with a directional light reflecting property in accordance with the present invention;

FIG. 5 is diagrams showing the distributions of the brightness in illumination front surface of the base plate when the area of the bevelled portion of the rear surface of the base plate is varied;

FIG. 11 is a cross-sectional view showing an alternative embodiment of the diffusing device of the present invention;

FIG. 12 is a cross-sectional view showing a further alternative embodiment of the diffusing device of the present invention;

FIG. 13 is a perspective view showing another embodiment of the diffusing device of the present invention;

FIG. 14 is a plan view of FIG. 14;

FIG. 32 is a cross-sectional view showing an example of the diffusing device of the present invention incorporated in the display device of FIG. 31;

FIG. 33 is a cross-sectional view showing another example of the diffusing device of the present invention incorporated in the display device of FIG. 31;

FIG. 34 is an elevational view partly in section showing an example of the display as well as the internal construction of the display device of FIG. 31;

FIG. 35 is a fragmentary view showing the driving mechanism of the display device of FIG. 31;

FIG. 36 is a front view showing the indication by means of liquid crystal;

FIG. 37 is a schematic side view of FIG. 36; and

FIG. 38 is a sectional view showing the construction of the liquid crystal indicating device of FIG. 36.

DETAILED DESCRIPTION OF THE PREFERRED EMBODIMENTS

Figure 1:
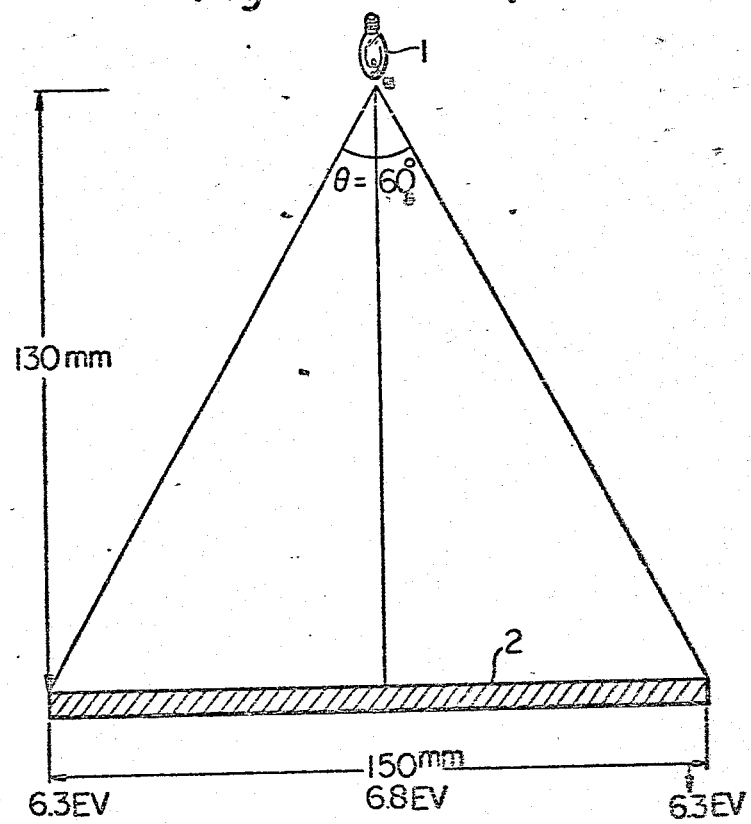
FIG. 1 is a schematic plan view showing an example of the light diffusing device of the prior art.

Before describing the present invention, a prior art light diffusing device for illumination purpose will be described with reference to FIG. 1. The prior art diffusing device shown in FIG. 1 comprises a light source 1 and a milk glass plate 2 located a distance from the light source 1 perpendicular to the optical axis of the light source 1 so that the surface of the milk glass plate 2 opposite to that at which side the light source 1 is located is uniformly illuminated. In such an arrangement, it is necessary to use as a light source 1 a tungsten lamp of $9V \times 0.25A$ located at a distance of 130 mm from the milk glass plate 2 of transmittivity of 52% in order to obtain uniform illumination of about 0.5 EV over the entire area of 150 mm of the milk glass plate 2. Therefore, the prior art diffusing device requires a greater electric power and a large space in the thickness perpendicular to the plane of illumination of the milk glass plate 2.

The present invention provides an extremely thin diffusing device requiring a transparent base plate of the thickness of only 7mm, a light source located adjacent to a side edge of the base plate and a light reflecting plate located adjacent to the rear surface of the base plate in order to obtain uniform brightness of the front illuminating surface of sufficient intensity over the entire area thereof as described below.

Figure 2:
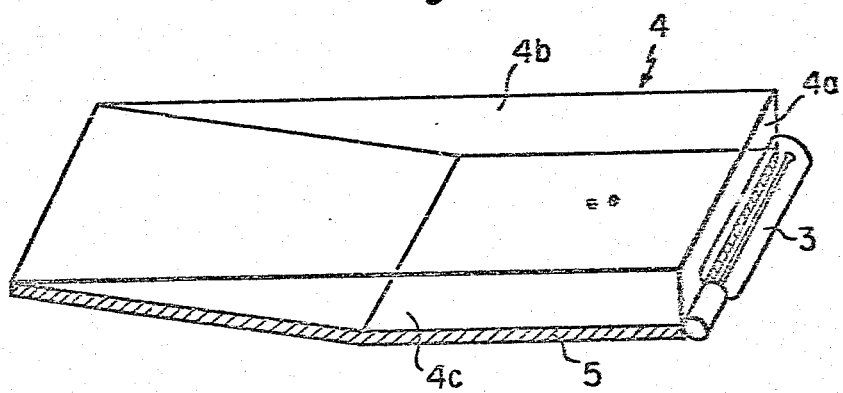
FIG. 2 is a perspective view showing an embodiment of the light diffusing device constructed in accordance with the present invention.

FIGS. 2 and 3 show an embodiment of the diffusing device of the present invention. It comprises a light source 3, a thin transparent base plate 4 with its transparent smooth side edge 4a being located adjacent to the light source 3 so as to receive light therefrom into the base plate 4 through the side edge 4a, and a light reflecting plate 5 located in contact with or adjacent to the rear surface 4c. A portion of the rear surface 4c of the base plate 4 is bevelled so as to reduce the thickness at the side edge opposite to the side edge 4a to substantially zero. The front surface 4b is of a smooth transparent surface and serves as the light emitting surface. The rear surface 4c is treated so as to have appropriate light diffusing reflecting and transmitting properties. Thus, a portion of the light received in the base plate 4 from the light source 3 through the side edge 4a is directly emanated from the front surface 4b and the remainder of the light is reflected by the rear surface 4c so as to be emanated from the front surface 4b or repeatedly reflected between the rear surface 4c and the front surface 4b and finally emanated from the front surface 4b, or a portion of the light transmitted through the rear surface 4c is reflected by the reflecting plate 5 so as to be emanated from the front surface 4b, thereby permitting the intensity of illumination by the front surface 4b to be made uniform over the entire area thereof.

The bevelled portion of the rear surface 4c serves to concentrate the reflected light toward the side edge of the base plate 4 opposite to the side edge 4a so that the uniformity of the intensity of illumination by the front surface 4b is insured.

The present inventions have made extensive experiments and tests for improving the uniformity of the illumination of the front surface 4b and found that the uniformity of the illumination of the front surface 4b is improved if the rear surface 4c is treated so as to have directional light reflecting and light transmitting property so that the reflected light is predominantly directed toward the side edge of the base plate 4 opposite to the side edge 4b while the reflecting plate 5 is treated so as to have a superior light diffusing property with the minimum absorption so that the light incident to the reflecting plate 5 is effectively reflected toward the front surface 4b of the base plate 4.

Figure 9:
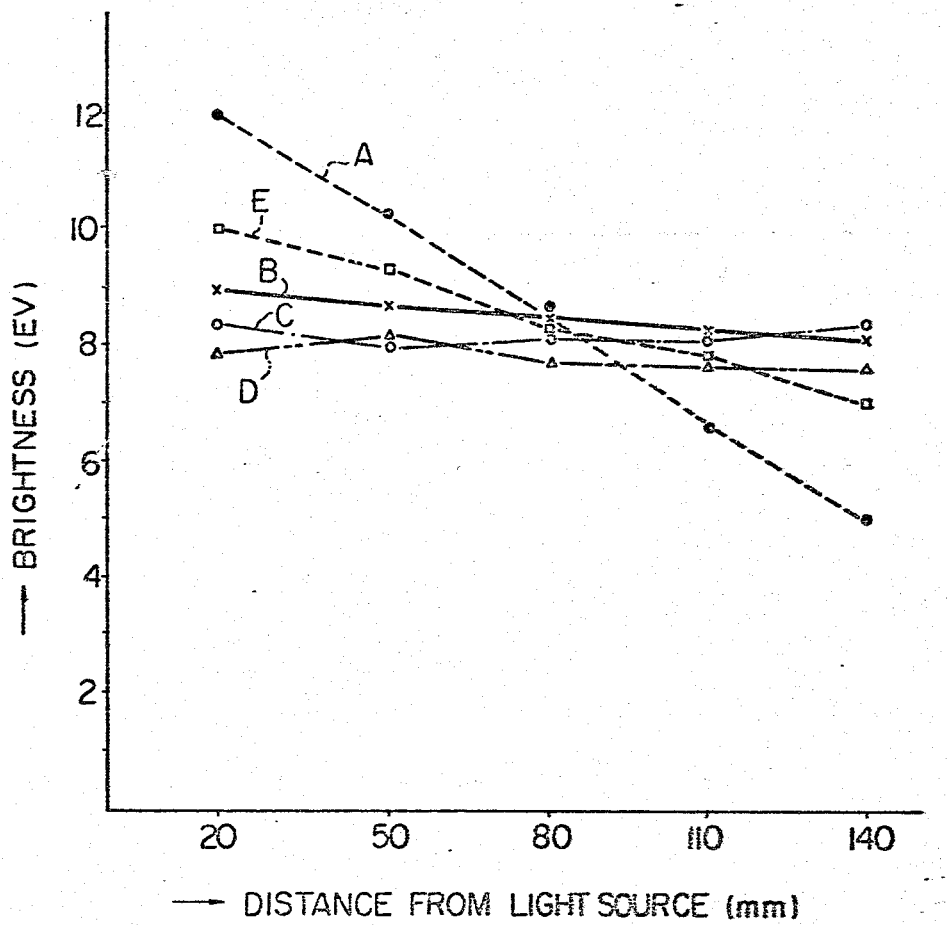
FIG. 9 is a diagram showing various curves of the distribution of the brightness of various types of the roughening of the roughened rear surface of the base plate.

FIG. 4 shows an example of the preferred treatments of the rear surface 4c of the base plate 4 in accordance with the present invention so as to obtain superior directional light reflecting and transmitting property. To this end, a plurality of parallel small grooves 4d defined by a plurality of parallel small ridges running in the direction from the side edge 4a to the opposite side edge is formed in the rear surface 4c. The rear surface 4c roughened in such a manner has been proved to exhibit a superior directional light reflecting and transmitting property predominantly directing the light from the side edge 4a toward the opposite side edge with the absorption being rendered to be minimum. FIG. 9 shows the relationship between the distribution of the brightness of the front surface 4b obtained by the reflection of light from the various types of roughening of the rear surface 4c to afford the directional reflecting and transmitting property. In the present invention, it is preferred to use the types B, C and D of the roughening of the rear surface 4c in order to achieve uniform distribution of the brightness.

FIG. 5 shows the relationship between the size of the bevelled portion of the rear surface 4c of the base plate 4 and the distribution of the brightness in the illumination front surface 4b of the base plate 4. As seen by the comparison between FIGS. (a), (b) and (c), a uniform distribution of the brightness in the front illuminating surface 4b is obtained if the bevelled portion assumes ⅓ to ⅔ of the entire area of the rear surface 4c.

Figure 6:
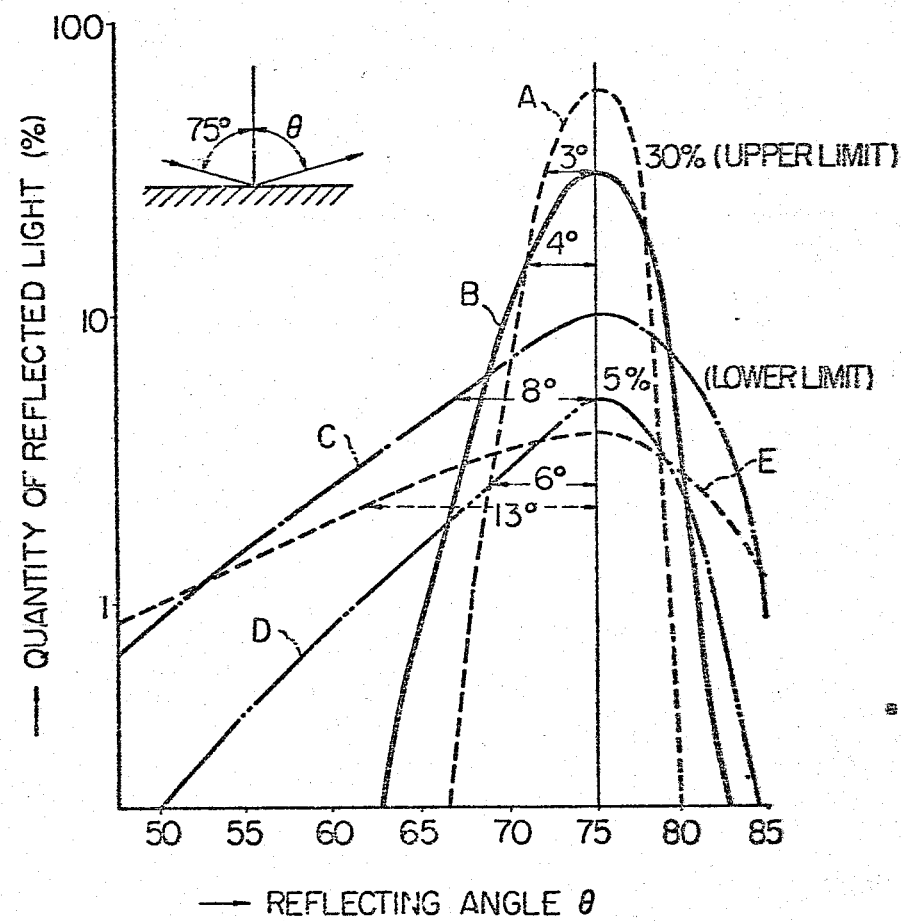
FIG. 6 is a diagram showing various curves of the distribution of the reflected light from the rear surface of the transparent base plate as measured in parallel to the direction of the directional property of the roughened rear surface of the base plate.
Figure 7:
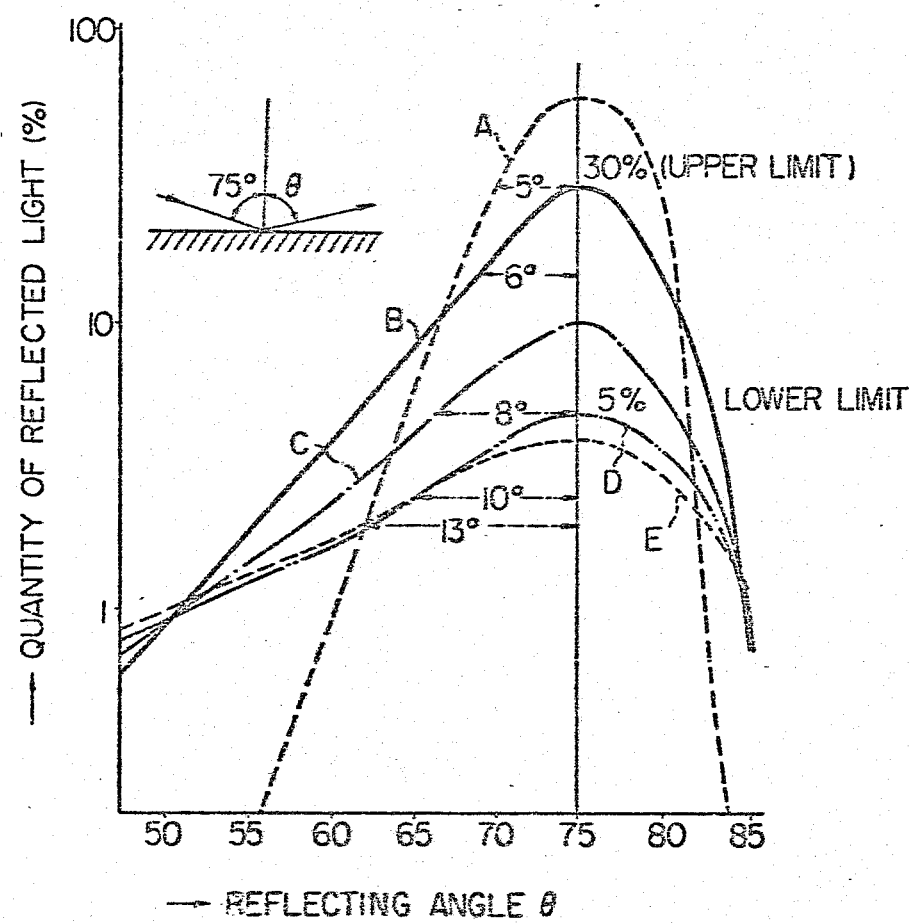
FIG. 7 is a diagram showing various curves of the distribution of the reflected light from the rear surface of the base plate as measured perpendicular to the direction of the directional property of the roughened rear surface of the base plate.

FIG. 6 shows the distribution of the reflected light from the rear surface 4c as measured in parallel to the directional property of the roughened rear surface 4c, i.e., in the direction parallel to the grooves 4d when the incident angle of the light is set at 75° in the direction parallel to the grooves 4d. As shown, the peak of the reflected light quantity lies in the reflecting angle of 75° and has the value of 5–30% of the incident light quantity, the width of the half value being in the range of 4°–8°. FIG. 7 shows the distribution of the reflected light quantity from the rear surface as measured in the direction perpendicular to the direction of the grooves 4d when the incident angle is selected to be 75° in the direction perpendicular to the grooves 4d. The peak lies in the reflecting angle of 75° and the value is 5–30% with the width of half value being in the range of 6°–10°.

Figure 8:
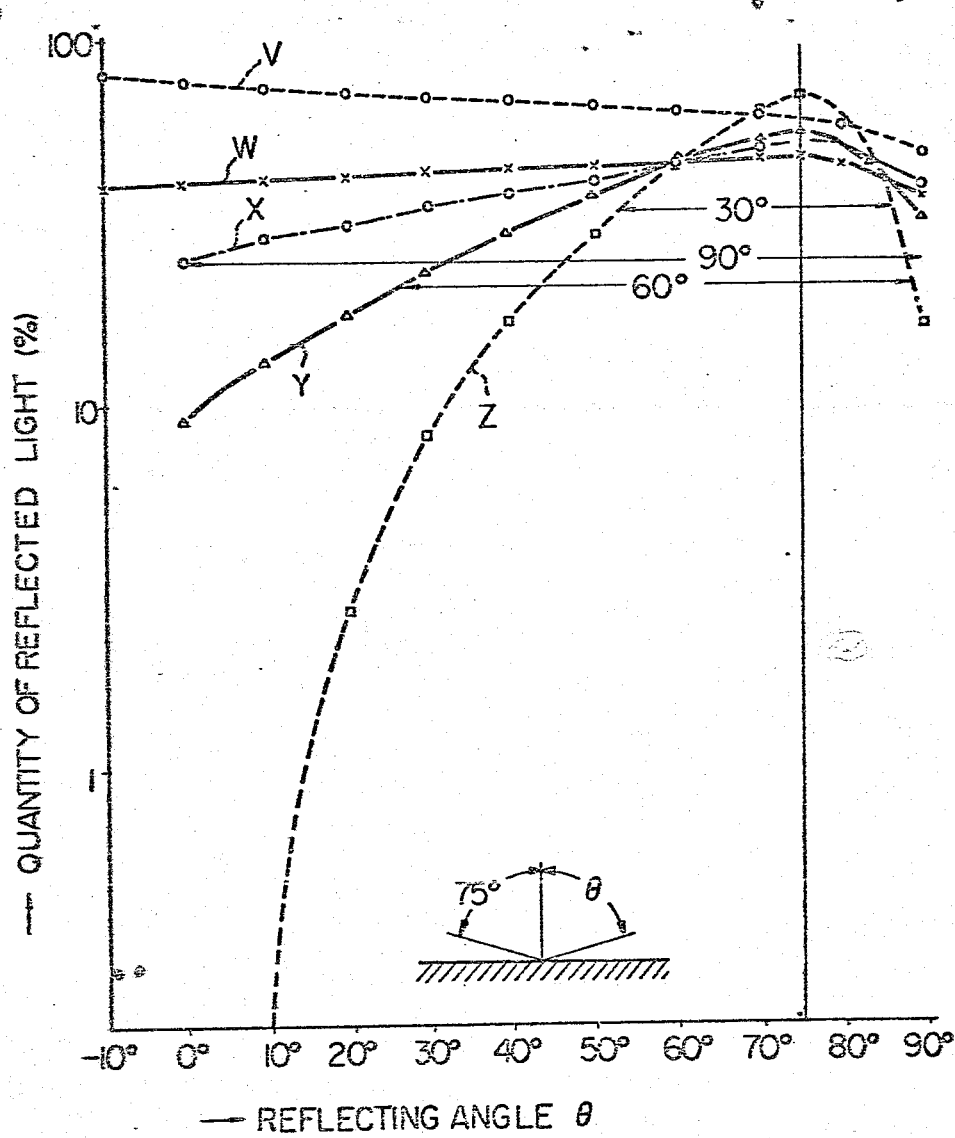
FIG. 8 is a diagram showing various curves of the distribution of the reflected light from the reflecting plate.
Figure 10:
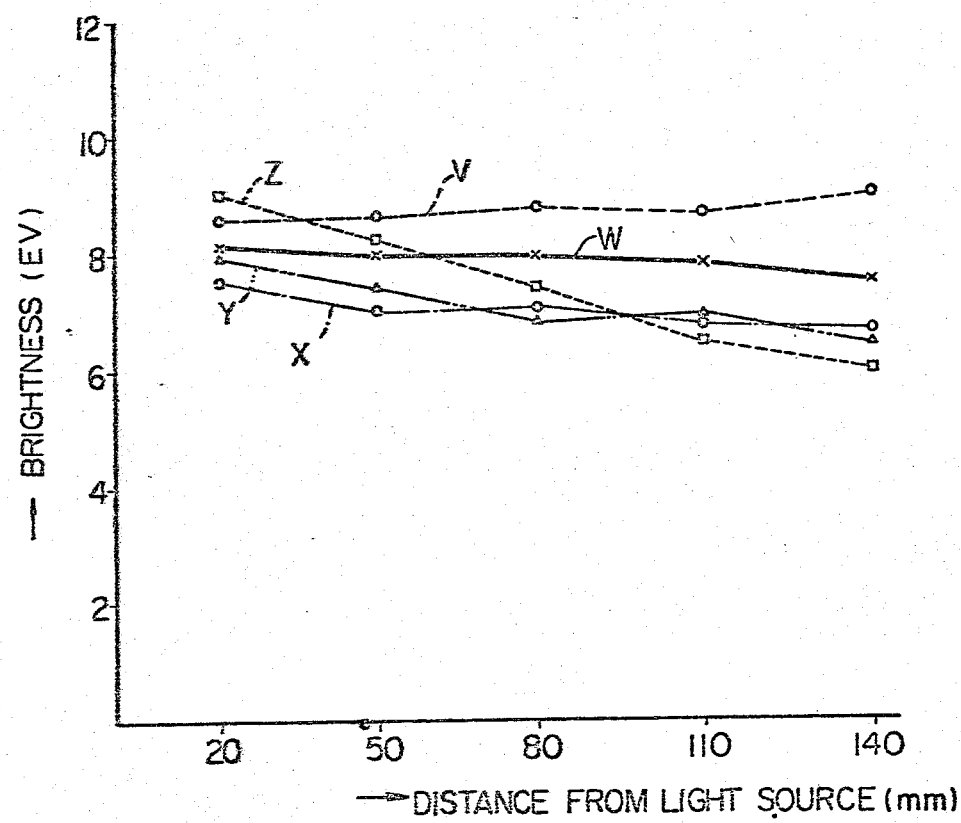
FIG. 10 is a diagram showing various curves of the distribution of the brightness of various types of the reflecting plate.
Figure 15:
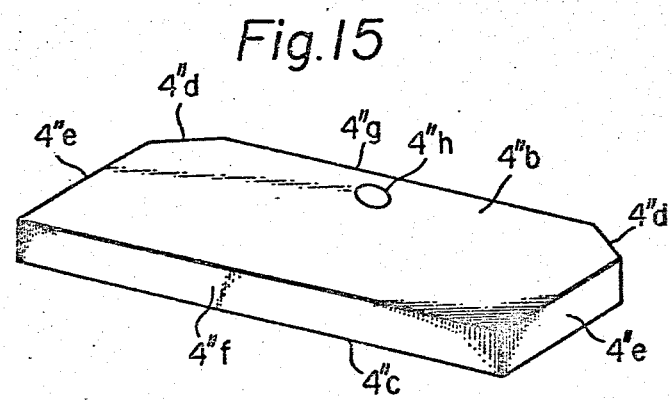
FIG. 15 is a perspective view showing the transparent base plate used in the diffusing device of FIG. 13.

FIG. 8 shows the various reflecting properties of the reflecting plate 5 when the incident angle is set at 75°. It is preferred in the present invention to use a reflecting plate having the reflecting power of more than 30% and the width of the half value of more than 90°. The characteristics of the preferred reflecting plate is shown by the curves V, W and X in FIG. 10.

The diffusing device of the present invention as described above is constructed in very thin configuration having a thickness of only 7mm and still provides a superior uniform distribution of sufficient brightness of the front surface 4b of the base plate 4 by virtue of the specific configuration, arrangement and treatment of the transparent base plate 4 and the reflecting plate 5 by using a single light source 3.

In the above description, the front illuminating surface 4b has been shown as being a smooth surface. However, the front surface may be treated so as to have a light diffusing property when a better uniformity of the illumination over the larger area is desired although the efficiency of light is deteriorated to some extent. Alternatively, a light diffusing plate may be additionally arranged in front of the front illuminating surface of the base plate.

FIG. 11 shows an alternative embodiment of the diffusing device of the present invention suitable for the front illuminating surface having a very great length. In this embodiment, two sets of the diffusing device shown in FIG. 3 are symmetrically arranged with the side edges opposite to those adjacent to the light source being abutted against each other. The function and effectiveness of the embodiment of FIG. 11 are the same as those obtained by the embodiment of FIG. 3.

FIG. 12 shows a further embodiment of the present invention suitable for a front illuminating surface of a greater length. In this embodiment, the rear surface 4'c of the base plate 4' has no bevelled portion, but, instead, a further light source 3 is located adjacent to the side edge 4'a which is opposite to that adjacent to which the light source 3 is located. The function and the effectiveness of the embodiment of FIG. 12 is similar to those obtained by the embodiment of FIG. 3.

FIG. 13 shows a still further embodiment of the diffusing device of the present invention.

Figure 16:
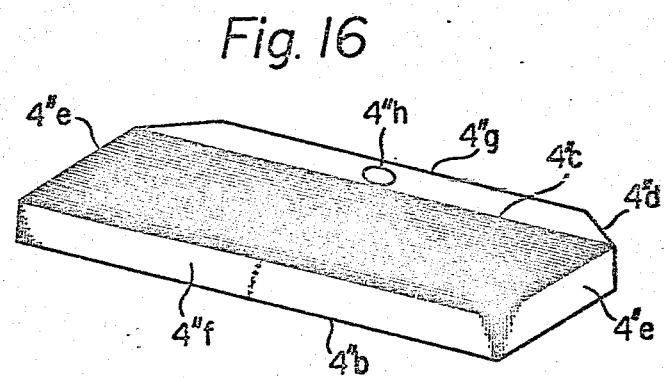
FIG. 16 is a perspective view showing the roughened rear surface of the base plate of FIG. 15.

In this embodiment, the transparent base plate 4" is of an elongated thin rectangular shape with two small bevelled portions 4"d being provided at the ends of a longitudinal side thereof. The elongated rectangular area defined by the chain line and the side of the base plate 4" opposite to that provided with the bevelled portions 4"d serves as the illuminating surface. At least a hole 4"h is formed in the base plate 4" in which a light source 3 is located so that the light therefrom is received into the base plate 4". The peripheries 4"d, 4"e, 4"f and 4"g of the base plate 4" are covered by light reflecting plates 5". The rear surface 4"c of the base plate 4" is roughened as shown in FIG. 16 so as to provide a directional light reflecting property as in the case of the embodiment of FIG. 3. A light reflecting plate 5 having a diffusing property is located adjacent to or in contact with the rear surface 4"c. A portion of the light received in the base plate 4" is directly emanated from the front illuminating surface 4"b while the remainder of the light is reflected by the reflecting plates 5, 5" so as to be finally emanated from the front illuminating surface 4"b thereby permitting uniform illumination to be obtained over the entire area of the front surface 4"b. More than one light source may be arranged along the side of the base plate having the bevelled portions 4"d so as to increase the intensity of the illumination and the uniformity of the illumination.

The area of the illuminating front surface in which a uniform illumination of sufficient intensity is obtained can be made 25 × 300 mm by using a tungsten lamp of 6.3V × 0.3 Amp and having the length of 25mm, the longitudinal length of 300 mm being twice as large as that obtained by the prior art diffusing device.

Figure 17:
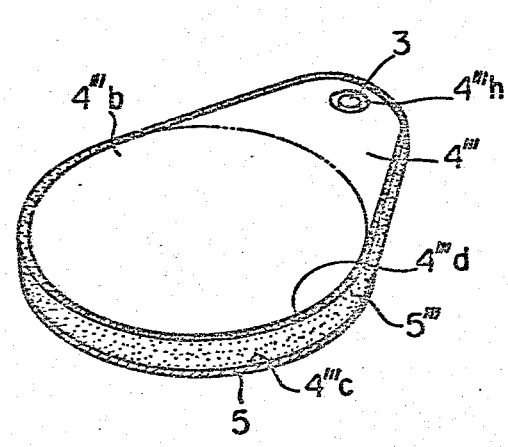
FIG. 17 is a perspective view showing a further embodiment of the diffusing device of the present invention.
Figure 18:
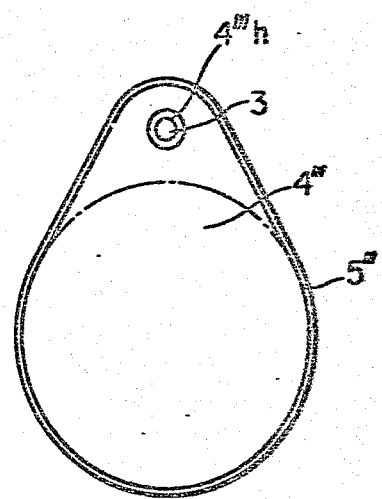
FIG. 18 is a plan view of FIG. 17.

FIG. 17 shows an embodiment similar to that shown in FIG. 13 which is adapted to provide a circular illuminating front surface. The function and the effectiveness of the embodiment of FIG. 17 are apparent from the description relating to the embodiment of FIGS. 13 to 16.

Figure 19:
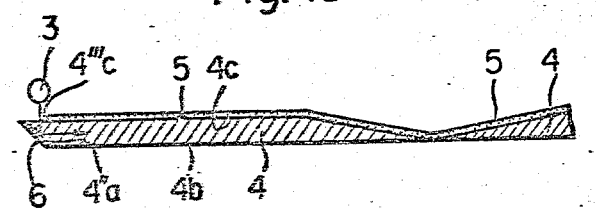
FIG. 19 is a fragmentary cross-sectional view showing an alternative form of the diffusing device of the present invention.

FIG. 19 shows a further embodiment of the diffusing device of the present invention. In this embodiment, the light source 3 is arranged behind the rear surface of the base plate 4 and the side edge 4"a of the base plate 4 is oriented at an acute angle with respect to the rear surface of the base plate 4 and a light reflecting plate 6 is provided in contact with the side edge 4"a so that the light from the light source 3 is received in the base plate 4 through the portion 4"c of the rear surface 4c where the reflecting plate 5 is cut away for passing the light through the rear surface 4"c. The light received in the base plate 4 is reflected by the reflecting plate 6 so that the function and effectiveness obtainable by the embodiment of FIG. 3 are achieved.

Figure 20:
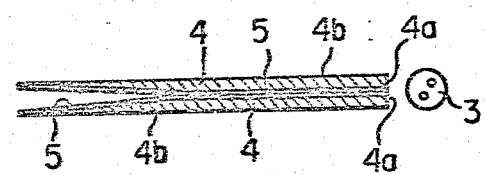
FIG. 20 is a cross-sectional view showing a still further embodiment of the diffusing device of the present invention.

FIG. 20 shows an embodiment of the present invention, in which a pair of illuminating surfaces are provided by using a single common light source. In this embodiment, a pair of diffusing devices as shown in FIG. 3 are arranged in parallel to each other with the reflecting plates 5 being faced against each other so that the side edges 4a are located adjacent to a common single light source 3, thereby affording two illuminating surfaces 4b directed to the opposite direction to each other.

A plurality of the pair of parallel diffusing devices shown in FIG. 20 may be arranged radially about the single light source 3 so that a number of illuminating surfaces are obtained about a single light source.

Figure 21:
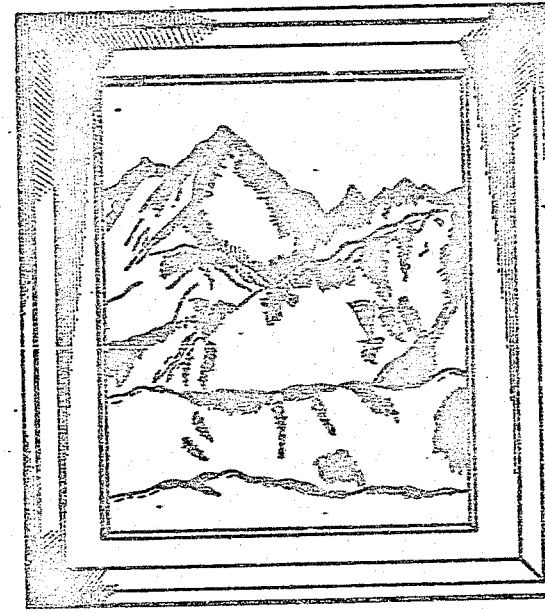
FIG. 21 is a front view showing a picture frame incorporating the diffusing device of the present invention.
Figure 22:
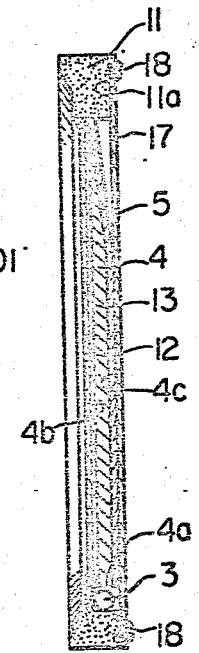
FIG. 22 is a vertical cross-sectional view of FIG. 21.
Figure 23:
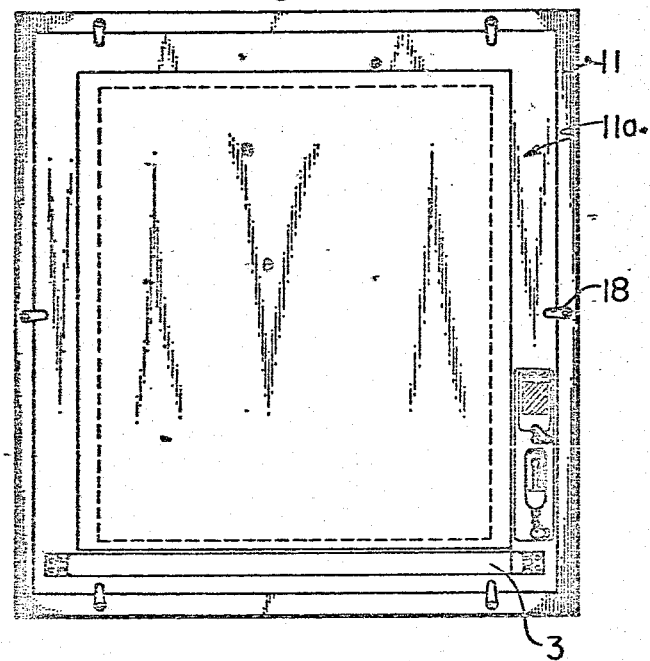
FIG. 23 is a rear view of FIG. 21.

FIG. 21 shows the diffusing device of FIG. 3 incorporated in a picture frame so that an effective decoration appliance is provided. The device shown in FIG. 21 comprises a main frame 11, a transparent front glass plate 12 located in the front side of the main frame 11, and a rear panel 17 detachably secured to the rear side of the main frame 11 by means of fastening means 18 (FIG. 23) provided on the rear side of the main frame 11. The diffusing device comprised of a base plate 4, a reflecting plate 5 and a light source 3 similar to that shown in FIG. 3 is housed in the interior of the main frame 11. An image bearing transparent film or panel 13 is sandwiched between the front glass plate 12 and the front illuminating surface 4b of the base plate 4. Thus, the image on the film 13 is uniformly illuminated by the front surface 4b to exhibit excellent showing of the image on the film 13. It is apparent that any suitable one of the diffusing devices described above other than that shown in FIGS. 21-23 may be used with the picture frame shown in FIG. 21.

Figure 24:
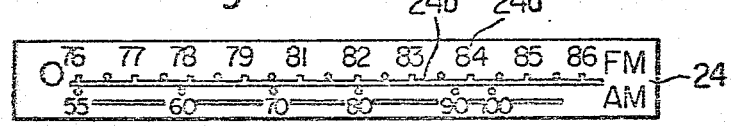
FIG. 24 is a front view showing an indicating panel of a radio or a stereo player which is used with the diffusing device of the present invention to constitute an indicating device.
Figure 25:
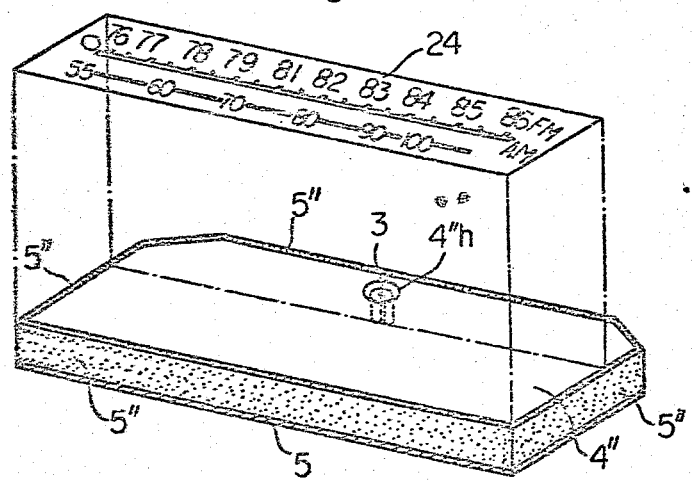
FIG. 25 is an exploded perspective view showing the diffusing device of the present invention to be assembled with the indicating panel of FIG. 24.

FIG. 24 shows an indicating panel 24 having numerals 24a and a scale 24b for a radio and a stereo player and the like to be used with the diffusing device of the present invention. FIG. 25 shows the diffusing device of FIG. 13 to be assembled with the panel 24 of FIG. 24. Thus, the panel 24 is uniformly illuminated by the diffusing device so as to provide superior indication. Any suitable one of the diffusing devices described above other than that shown in FIG. 25 may also be used with the indicating panel 24.

Figure 26:
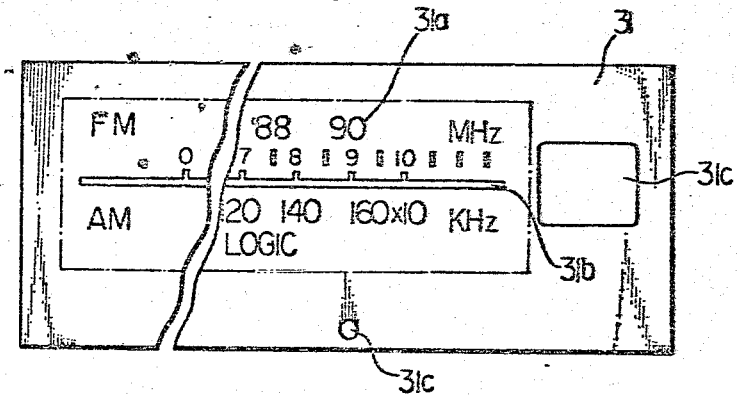
FIG. 26 is a front view showing an indicating device in which the diffusing device of the present invention is incorporated.
Figure 27:
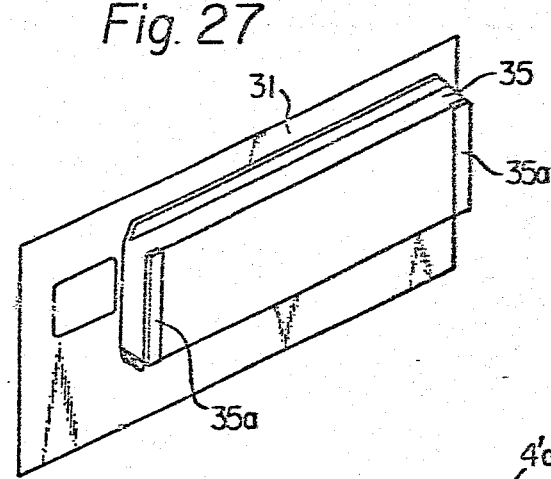
FIG. 27 is a perspective view showing the rear side of the indicating device of FIG. 26.
Figure 28:
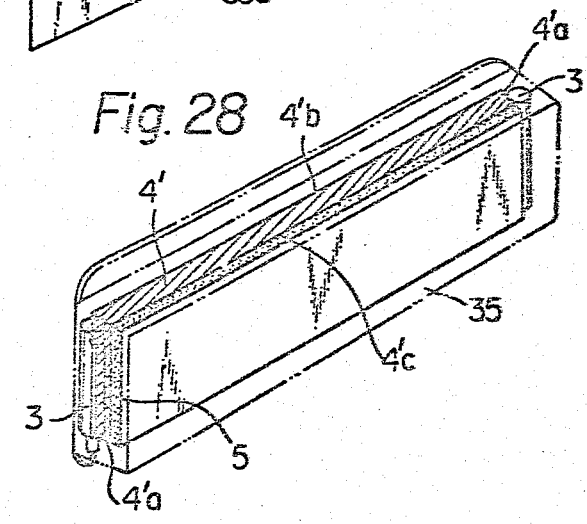
FIG. 28 is a perspective view showing the diffusing device of the present invention incorporated in the indicating device of FIG. 26.

FIG. 26 shows a transparent indicating device 31 for a radio and a stereo player and the like to which the diffusing device of the present invention is applied so as to exhibit uniform indication of the numerals 31a and the scale 31b. In this embodiment, the diffusing device shown in FIG. 12 is housed in the housing 35 as shown in FIG. 28 so as to uniformly illuminate the indicating device 31. Other suitable diffusing device of the present invention may be used instead of that shown in FIG. 28.

Figure 29:
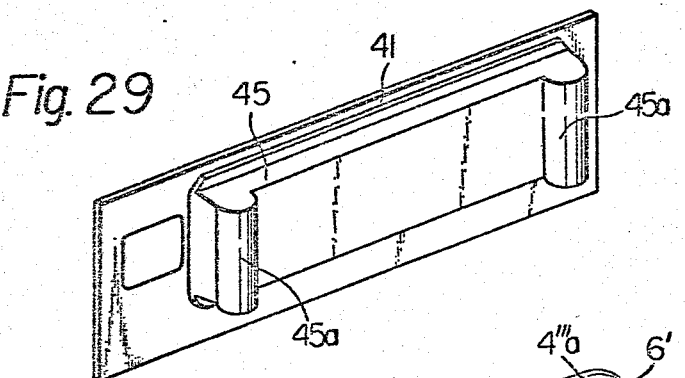
FIG. 29 is a rear perspective view showing an alternative form of the indicating device incorporating the diffusing device of the present invention.
Figure 30:
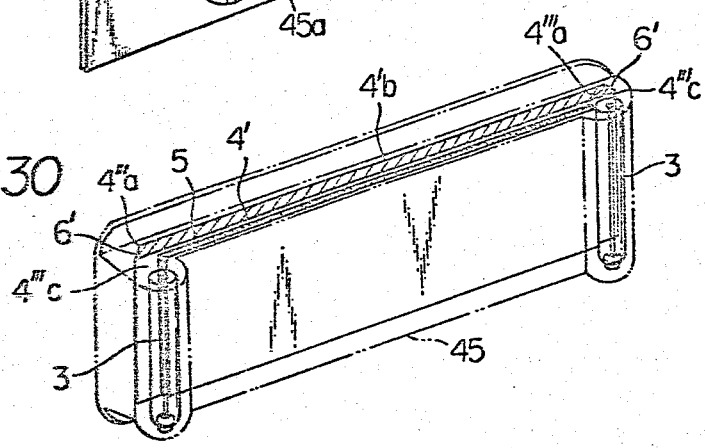
FIG. 30 is a perspective view showing the diffusing device of the present invention incorporated in the indicating device of FIG. 29.

FIGS. 29 and 30 show an alternative form of the indicating device of FIG. 26. The indicating device 41 of FIG. 29 is combined with the diffusing device in which the light source 3 is located behind the rear surface of the base plate in like manner as shown in FIG. 19.

Figure 31:
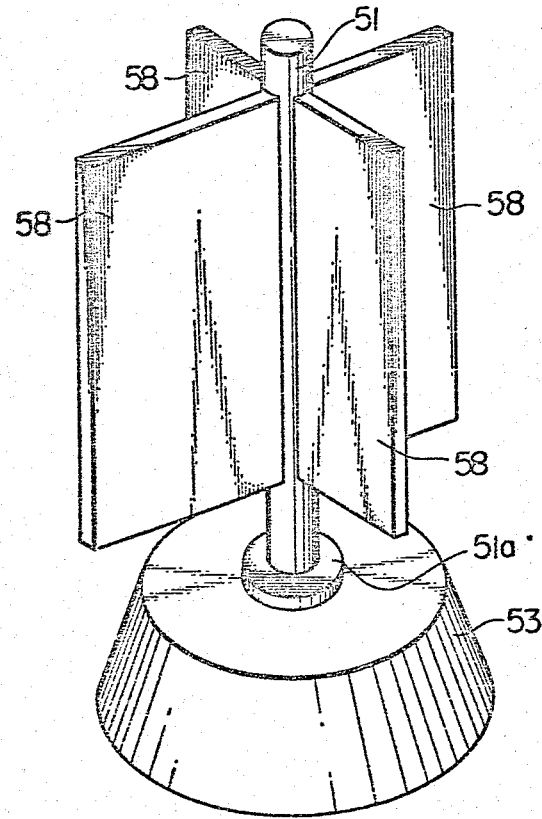
FIG. 31 is a perspective view showing a display device incorporating the diffusing device of the present invention.

FIG. 31 shows a rotary display device with which the diffusing device of FIG. 20 is combined so that a variety of advertisements or displays are obtained by efficiently using a single light source. As shown in FIGS. 34 and 35, the light source 3 is stationarily located in vertical position at the center of the rotary tube 51 having rotary flanges 51a, 51b and a gear 52 fixed thereto. Casings 58 having transparent front and rear walls 58d are secured to the tube 51 radially extending therefrom and the diffusing device as shown in FIG. 33 is housed in each of the casings 58 so that the light from the light source 3 is received through the respective side edge 4a of the diffusing device. A display sheet or film 58c is located in contact with each of the front illuminating surfaces of the base plates 4 of the diffusing devices. Thus, the display sheets 58c are illuminated efficiently by the illuminating front surfaces of the base plates 4. The flanges 51a and 51b are rotatably supported by the upper wall of the base member 53 and the supporting member 53a fixed to the base member 53 with a plurality of balls rollingly interposed between the races of the flanges 51a, 51b and the races of the upper wall and the supporting member 53a so as to constitute thrust bearings, respectively.

A pinion 57 secured to the shaft 56a of a motor 56 in the base member 53 meshes with the gear 52 secured to the tube 51, thereby rotating the tube 51 together with the radially extending casings 58 to enhance the display. The light source 3 is energized through lead wires 59a, 59b.

The diffusing device of FIG. 33 may be replaced by that shown in FIG. 32. In this case, only one side of each of the casings exhibits the display.

FIGS. 36 to 38 show a liquid crystal indicating device in which the diffusing device of the present invention is incorporated.

In a liquid crystal indicating device, a light diffusing reflecting plate is in general located behind the block of the liquid crystal panel having polarizing plates attached to the front and rear surfaces thereof so that the light incident to the block from the front surface is diffused and reflected by the reflecting plate so as to uniformly illuminate the block thereby providing indication of numerals and the like in dark appearance in the bright back ground. However, such a device can not be used in a dark room, because the light incident to the block from the front surface of the block is insufficient for the indication.

According to the present invention, the block of the liquid crystal comprised of a liquid crystal panel 62 having polarizing plates 62a, 62b on the front and rear surfaces thereof is provided with a transparent base plate 4' having a reflecting plate 5 on the rear surface thereof integrally molded or formed thereon.

The light sources 3 are located adjacent to the side edges 4'a of the base plate 4' so that the light is emanated uniformly from the front surface 4'b of the base plate 4 to uniformly illuminate the liquid crystal panel 61 to exhibit clear indication of the numerals or the like even in the dark room. The diffusing device may be replaced by any of the suitable diffusing devices previously described.

We claim:

1. In a light diffusing device for illumination purposes including a light source, a thin transparent base plate having a front illuminating surface and a rear surface with a side edge arranged adjacent to said light source, said rear surface being a roughened surface with a directional light reflecting property parallel to major side edges of said base plate, and a light reflecting plate arranged adjacent to said rear surface for permitting light from said light source to be received into said base plate and emanated from said front illuminating surface directly or after being reflected by said rear surface and said light reflecting plate so that uniform illumination is obtained over the entire area of said front illuminating surface, the light reflecting property of said roughened rear surface being determined so that, when the light is incident thereto at an angle of 75° in a plane parallel to the direction of the major side edges of said base plate, the peak of the reflecting power is in the range of 5–30% at the reflecting angle of 75° and the width of the half value is in the range of 4°–6°, when the light is incident at an angle of 75° in a plane perpendicular to the direction of the major side edges, the peak of the reflecting power is in the range of 5–30% at the reflecting angle of 75° and the width of the half value is in the range of 6°–10°, said light reflecting plate having a light reflecting power substantially greater than 30% and a width of the half value of the distribution of the reflecting light greater than 90°, whereby uniform illumination prevails over the entire area of said illuminating surface by a combination of the optical properties of said rear surface and said reflecting plate, said rear surface of said base plate having a plurality of small parallel grooves defined by a plurality of small parallel ridges running in the direction from said side edge of said base plate adjacent to said light source to the opposite side edge, said light reflecting plate being of a light diffusing reflecting surface having an extremely low transparency and absorption.

2. Device according to claim 1, wherein a portion of said rear surface of said base plate located at the side edge thereof opposite to that adjacent to said light source is beveled so as to reduce the thickness of said edge opposite to that adjacent to said light source substantially to zero.

3. Device according to claim 2, wherein said portion of said rear surface of said base plate comprises about ⅛ to ⅔ of the entire area of said rear surface.

4. Device according to claim 2, comprising a pair of light sources, a pair of transparent base plates and a pair of light reflecting plates arranged in symmetrical relationship to each other with the side edges of said base plates opposite to those adjacent to said light sources being connected to each other.

5. Device according to claim 2, wherein said side edge of said base plate adapted to receive light from said light source is inclined at an acute angle with respect to said rear surface and a light reflecting plate is provided on said inclined side edge, said light source being located behind said rear surface so that light from said light source incident to said base plate through said rear surface is reflected at said side edge by said reflecting plate toward the opposite side edge of said base plate.

6. Device according to claim 2, wherein a plurality of said base plates having reflecting plates thereon are arranged radially about a single common light source with the respective side edges adapted to receive light being located adjacent to said light source.

7. Device according to claim 2, further comprising a frame housing therein said base plate provided with said light source and said reflecting plate with said illuminating front surface facing toward the front of said frame, and an image bearing transparent member attached to said illuminating front surface thereby constituting a picture frame assembly of uniform illumination of the image.

8. Device according to claim 2, comprising a pair of said base plates arranged in parallel to each other with the rear surfaces provided with said reflecting plates thereon being faced against each other while the respective side edges adapted to receive light are located adjacent to a single common light source.

9. Device according to claim 8, a plurality of pairs of said base plates are arranged radially about a single common light source with the respective side edges adapted to receive light being located adjacent to said light source.

10. Device according to claim 9, further comprising an image bearing member attached to each of said illuminating front surfaces so as to constitute a display device.

11. Device according to claim 10, further comprising driving means for rotating each of said base plates about said light source together with said reflecting plates so as to constitute rotary display device.

12. Device according to claim 1, wherein said front surface of said base plate is treated so as to have a light diffusing property.

13. Device according to claim 1, further comprising another light source located adjacent to the side edge of said base plate opposite to that adjacent to said first mentioned light source thereby permitting light from said another light source to be received by said opposite side edge of said base plate so as to to be transmitted therethrough in the direction opposite to that received from said first mentioned light source so as to be emanated from said front surface over the entire area thereof in addition to the light from said first mentioned light source.

14. Device according to claim 13, further comprising an indicating panel attached to said illuminating front surface so as to constitute an indicating device.

15. Device according to claim 13, further comprising a pair of polarizing plates and a liquid crystal panel sandwiched between said polarizing plates, one of said polarizing plates being attached to said illuminating front surface thereby constituting liquid crystal indicating device.

16. Device according to claim 1, comprising at least a hole formed in said base plate at a position exterior of one longitudinal side of a portion of said base plate on which said illuminating front surface is formed, said hole providing said side edge adapted to receive light from said light source arranged in said hole, light reflecting plates being provided along the periferal side edges of said base plate.

17. Device according to claim 16, further comprising an indicating panel attached to said illuminating front surface of said base plate so as to constitute an indicating device.

18. Device according to claim 1, comprising a hole formed in said base plate at a position exterior of a circular area of said base plate on which said illuminating front surface is formed, said hole providing said side edge adapted to receive light from said light source arranged in said hole, light reflecting plates being provided along the peripheral side edge of said base plate.

19. Device according to claim 1, wherein said side edge of said base plate adapted to receive light from said light source is inclined at an acute angle with respect to said rear surface and a light reflecting plate is provided on said inclined side edge, said light source being located behind said rear surface so that light from said light source incident to said base plate through said rear surface is reflected at said side edge by said reflecting plate toward the opposite side edge of said base plate.

20. Device according to claim 19, further comprising an indicating panel attached to said illuminating front surface so as to constitute an indicating device.

* * * * *